United States Patent
Linde et al.

(10) Patent No.: US 9,126,623 B2
(45) Date of Patent: Sep. 8, 2015

(54) STEERING SHAFT

(75) Inventors: Joachim Linde, Waldstetten (DE); Volker Fuchs, Schwaebisch Gmuend (DE); Jutta Fuchs, legal representative, Schwaebisch Gmuend-Zimmern (DE)

(73) Assignee: Robert Bosch Automotive Steering GmbH, Gmuend (DE)

( * ) Notice: Subject to any disclaimer, the term of this patent is extended or adjusted under 35 U.S.C. 154(b) by 32 days.

(21) Appl. No.: 14/123,817

(22) PCT Filed: Jun. 14, 2012

(86) PCT No.: PCT/EP2012/061337
§ 371 (c)(1),
(2), (4) Date: Mar. 5, 2014

(87) PCT Pub. No.: WO2013/004466
PCT Pub. Date: Jan. 10, 2013

(65) Prior Publication Data
US 2014/0376839 A1 Dec. 25, 2014

(30) Foreign Application Priority Data
Jul. 5, 2011 (DE) .......................... 10 2011 051 557

(51) Int. Cl.
*F16C 3/035* (2006.01)
*B62D 1/185* (2006.01)
*B62D 1/20* (2006.01)
*B62D 7/22* (2006.01)
*F16D 3/06* (2006.01)
*F16C 29/04* (2006.01)

(52) U.S. Cl.
CPC ...... *B62D 1/185* (2013.01); *B62D 1/20* (2013.01); *B62D 7/224* (2013.01); *F16C 3/035* (2013.01); *F16C 29/04* (2013.01); *F16D 3/065* (2013.01); *F16C 2326/24* (2013.01)

(58) Field of Classification Search
CPC ................................ B62D 1/185; F16D 3/065
USPC .................. 464/167; 384/49, 57; 74/492, 493
See application file for complete search history.

(56) References Cited

U.S. PATENT DOCUMENTS

| 2,400,374 | A | * | 5/1946 | Selnes | 384/49 |
| 2,562,729 | A | * | 7/1951 | Merwin | 464/167 |
| 4,592,735 | A | * | 6/1986 | Orain | 464/167 X |
| 5,737,971 | A | * | 4/1998 | Riefe et al. | 74/493 |

FOREIGN PATENT DOCUMENTS

DE    103 59 962    7/2005

* cited by examiner

*Primary Examiner* — Gregory Binda
(74) *Attorney, Agent, or Firm* — Jordan and Hamburg LLP

(57) ABSTRACT

A steering shaft for a steering system of a motor vehicle, comprises an inner shaft mounted axially displaceably in a hollow shaft, wherein a rolling bearing having multiple metallic rolling elements, which are disposed axially in at least two rows, is disposed between the hollow shaft and the inner shaft. Previously known steering shafts cannot reliably present vibrations from being transmitted from the inner shaft to the hollow shaft. Therefore, the diameters of the metallic rolling elements decreases proceeding from the center of the rolling bearing toward the end faces thereof, wherein multiple mutually adjacent metallic rolling elements have identical and/or different diameters.

10 Claims, 2 Drawing Sheets

STEERING SHAFT

BACKGROUND OF THE INVENTION

The invention relates to a steering shaft, in particular for a steering system of a motor vehicle, comprising an inner shaft mounted axially displaceably in a hollow shaft, wherein a rolling bearing having multiple metallic rolling elements, which are disposed axially in at least two rows, is disposed between the hollow shaft and the inner shaft.

The use of internal combustion engines having high compression causes the steering shaft known from the prior art to vibrate, which is undesirably perceived on the steering wheel, especially when driving straight ahead and at the beginning of a steering motion. Various solutions using an air gap between an elastomer part and the inner shaft have not been able to effectively solve this problem. An air gap between the rolling bearing, which is equipped with rolling elements having identical diameters, and the hollow shaft has likewise not proven to be of value.

It is the object of the invention to improve steering shafts of this type to the effect that the vibrations generated by the internal combustion engine can no longer be transmitted between the inner shaft and the hollow shaft by way of the rolling bearing.

SUMMARY OF THE INVENTION

The invention achieves the stated object with a steering shaft of the type mentioned above, in which, according to the invention, the diameters of the metallic rolling elements decrease proceeding from the center of the rolling bearing toward the end faces thereof, wherein multiple mutually adjacent metallic rolling elements have identical and/or different diameters. As a result, the rolling elements having the largest diameter are located at the center of the rolling bearing, while the metallic rolling elements disposed closest to the end faces have the smallest diameter. Consequently, the risk that the vibrations can be transmitted by the rolling bearing to the hollow shaft, and thus to a steering wheel, is considerably reduced, even in the event of an inclined position of an inner shaft relative to the hollow shaft. Advantageously, the central rolling elements can have a particular distance from the hollow shaft and/or from the inner shaft, in order to reliably prevent the transmission of the vibrations.

The rolling elements may be disposed in an axially displaceable cage. The inner shaft can thus be easily displaced with respect to the hollow shaft in the axial direction by a large distance, while the rolling elements can be seated against the hollow shaft and/or against the inner shaft. The rolling elements can advantageously be mounted in the cage with a clearance forming a gap between the rolling elements and the hollow shaft and/or with a clearance forming a gap between the rolling elements and the inner shaft. Depending on the present installation position of the hollow shaft or of the inner shaft, due to gravity, the rolling element may thus rest both against a track that is incorporated in the hollow shaft and against a track that is integrated in the inner shaft. Due to the gap, the transmission of vibrations is precluded.

The metallic rolling elements can rest directly against each other. The rolling bearing thus has a minimal length, whereby the risk of transmission of vibration to the hollow shaft is still further minimized, in particular when the inner shaft is positioned at an incline relative to the hollow shaft.

In principle, it is also possible to dispose the metallic rolling elements at a distance from each other. This will depend in particular on the dimensions of the inner shaft and of the hollow shaft.

In a preferred embodiment, the outer rolling elements disposed in the regions of the end faces can be produced from plastic material. Polyacetal Engineering Polymers (POM) and Poly Ether Ether Ketone (PEEK) are particularly well suited for this purpose, due to the high temperature stability thereof and due to the good damping behavior thereof. The rolling elements produced from plastic material advantageously rest between the hollow tube and the inner shaft in a preloaded manner, so that they can reliably damp vibrations from the inner shaft onto the hollow tube, or from the hollow tube onto the inner shaft, during straight ahead travel or at the beginning of a steering motion, without the metallic rolling elements resting against the hollow tube or the inner shaft.

The rolling elements produced from plastic material advantageously have a larger diameter than the metallic rolling elements that are disposed at the center of the bearing. A clearance is thus created between the metallic rolling elements and the hollow tube, or the inner shaft, whereby the metallic rolling elements cannot transmit any vibrations to the hollow tube during straight ahead travel or at the beginning of the steering motion.

For the rolling bearing to have the shortest possible length, the rolling elements produced from plastic material can be disposed at a small distance from the metallic rolling elements.

When driving in a tight curve and/or during a steering motion of a stopped motor vehicle, not only the rolling elements produced from plastic material, but also the metallic rolling elements disposed at the center in the axial direction can rest against the hollow shaft and against the inner shaft. In this way, the metallic rolling elements disposed at the center also transmit torque, so that the rolling elements produced from plastic material are not deformed beyond the elastic range thereof, and are therefore protected from being damaged. Moreover, the damping behavior can be improved by the number of rolling elements produced from plastic material.

When the metallic rolling elements rest against the hollow shaft and against the inner shaft during a failure of an electrical or hydraulic power assistance system, the torque that is required for the steering motion can be reliably transmitted.

The rolling elements can advantageously be spheres, cylindrical rollers or tapered rollers.

The invention further relates to a motor vehicle, which according to the invention comprises a steering shaft.

A steering shaft according to the invention will be described hereafter in greater detail based on the accompanying drawings.

DETAILED DESCRIPTION OF THE PREFERRED EMBODIMENTS

Figure 1:
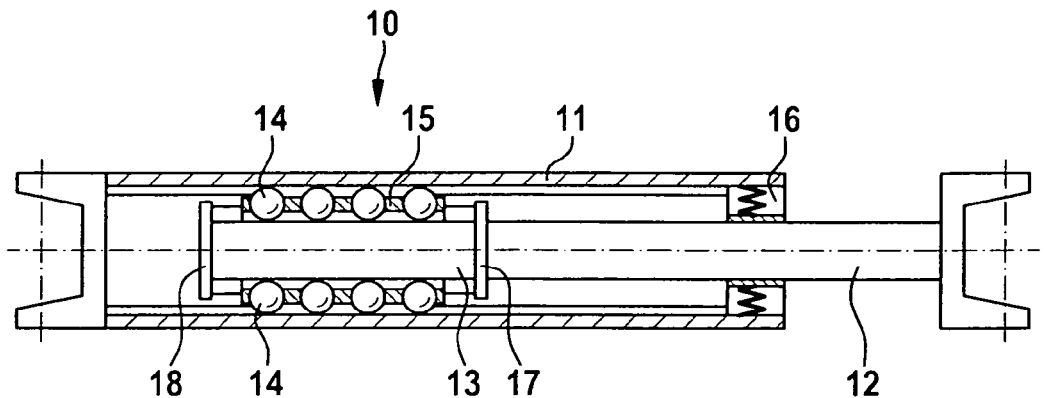
FIG. 1 shows a steering shaft known from the prior art.

FIG. 1 shows a steering shaft 10 which is known from the prior art and has a hollow tube 11 and an inner shaft 12. The inner shaft 12 is mounted in the hollow shaft so as to be displaceable in the axial direction by way of a rolling bearing 13. The rolling bearing 13 has rolling elements 14 disposed in multiple rows behind each other in the axial direction. In the present case, the rolling elements 14 are designed as spheres having the same diameter, and are disposed in an axially displaceable cage 15. The axial displaceability of the cage 15 is limited by stops 17 and 18 provided on the inner shaft 12. The rolling elements 14 are used to transmit a torque, which is introduced via a steering wheel that is not shown in detail here, from the hollow shaft 11 to the inner shaft 12, or vice versa, and thus to wheels, which likewise are not shown here. An elastic bearing bushing 16 is intended to prevent vibrations, which originate in particular from an internal combustion engine, from being transmitted to the hollow shaft 11, and thus to the steering wheel. However, this solution has not proven to be of value in practical experience. Even a gap between the rolling elements 14 and the hollow shaft 11, or the inner shaft 12, cannot prevent the undesirable transmission of the vibrations to the steering wheel.

Figure 2:
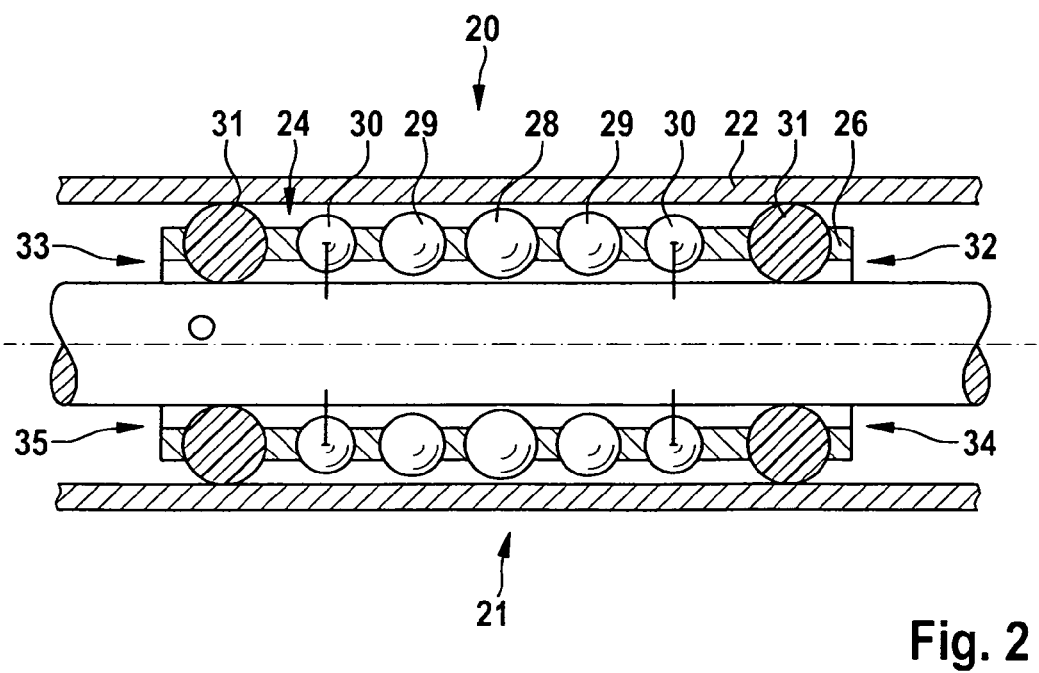
FIG. 2 shows a representation illustration of an embodiment of the steering shaft according to the invention.
Figure 3:
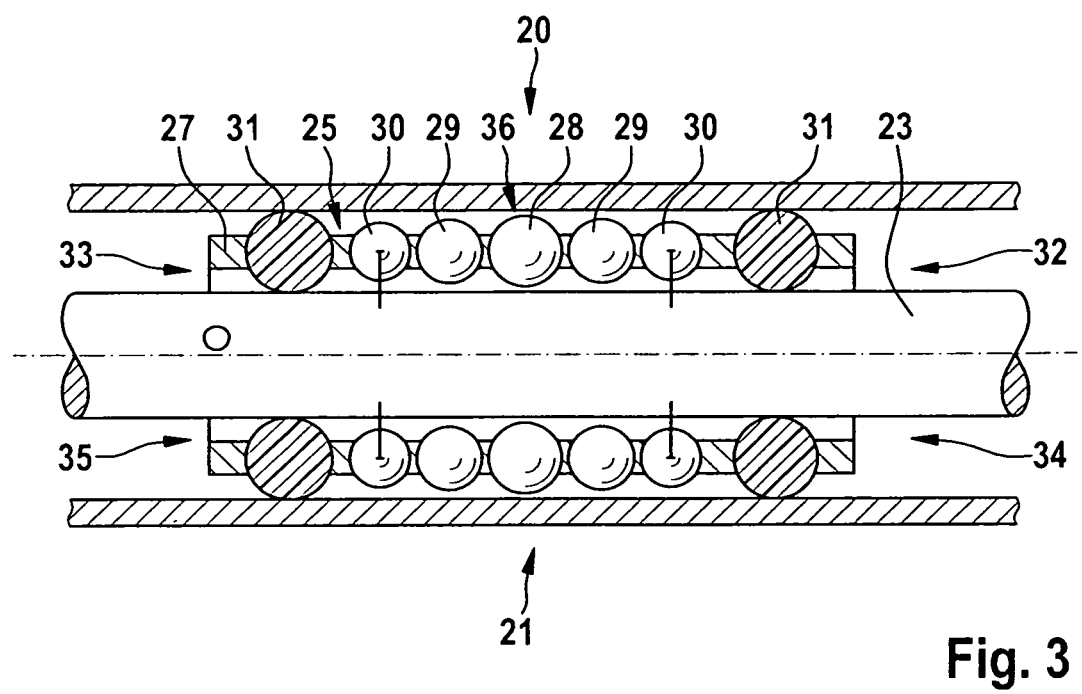
FIG. 3 shows a representation illustration of another embodiment of the steering shaft according to the invention.

FIGS. 2 and 3 show embodiments of steering shafts 20 and 21, respectively, according to the invention, in which like parts are given like part numbers. Each of steering shafts 20 and 21 have a hollow shaft 22 and an inner shaft 23. The inner shaft 23 is mounted displaceably in the axial direction by way of rolling bearings 24 and 25. The rolling bearings 24 and 25 have cages 26 and 27, in which metallic rolling elements 28, 29, and 30 as well as rolling elements 31 are disposed. The rolling elements 31 are produced from plastic.

The rolling elements 28 disposed at the center have the largest diameter, while the metallic rolling elements 30 disposed closest to the end faces 32 and 33, as well as 34 and 35, have the smallest diameter. The rolling elements 29 have a diameter between those of the rolling elements 28 and 30.

The rolling elements 28, 29 and 30 of the rolling bearing 24 are disposed at a distance from each other, while the rolling elements 28, 29 and 30 of the rolling bearing 25 rest directly against each other. The rolling bearing 25 is thus considerably shorter than the rolling bearing 24.

The rolling elements 31 produced from plastic material have a diameter that is larger than the diameter of the metallic rolling elements 28. A clearance 36 is thus created between the rolling elements 28 and the hollow shaft 22.

When a motor vehicle is stopped with the steering wheel not actuated, and during straight ahead travel, the rolling elements 31 produced from plastic material, which are preferably designed as spheres, can rest against the hollow shaft 22. The rolling elements 31 produced from plastic material have high damping power, so that they transmit vibrations from the inner shaft 23 to the hollow shaft 22 in a manner that is not perceptible to a person holding the steering wheel. The higher the number of rows formed of the rolling elements 28 to 31, the more effectively can the rolling elements 31 damp the vibrations. In addition, the rolling elements 31 produced from plastic material can transmit less torque at the beginning of a steering process from the hollow shaft 22 to the inner shaft 23.

When driving in a tight curve or during a steering motion of the stopped motor vehicle, not only the rolling elements 31 produced from plastic material, but also the metallic rolling elements 28 disposed at the center can rest against the hollow shaft 22 and transmit the torque.

At higher torques, as those that occur, for example, in the event of misuse, such as when driving over a curb, or in the event of a failure of a hydraulic or electrical power assistance system, the metallic rolling elements 29 and 30 having smaller diameters also increasingly rest against the hollow shaft 22, depending on the level of the torque. Thus, the greater the increase in the torque, the greater the number of the successively smaller rolling elements 29 and 30 that rest against the hollow shaft 22 will be.

LIST OF REFERENCE NUMERALS 10 steering shaft
11 hollow shaft
12 inner shaft
13 rolling bearing
14 rolling element
15 cage
16 bearing bushing
17 stop
18 stop
20 steering shaft
21 steering shaft
22 hollow shaft
23 inner shaft
24 rolling bearing
25 rolling bearing
26 cage
27 cage
28 rolling element
29 rolling element
30 rolling element
31 rolling element
32 end face
33 end face
34 end face
35 end face
36 gap

The invention claimed is:

1. A steering shaft for a steering system of a motor vehicle, comprising:
   an inner shaft;
   a hollow shaft; and
   a roller bearing;
   wherein the inner shaft is mounted axially displaceably in the hollow shaft;
   wherein the rolling bearing that has multiple metallic rolling elements, which are disposed axially in at least two rows, being disposed between the hollow shaft and the inner shaft; and
   wherein the diameters of the metallic rolling elements decrease proceeding from the center of the rolling bearing toward the end faces thereof.

2. The steering shaft according to claim 1, wherein the metallic rolling elements rest directly against each other.

3. The steering shaft according to claim 1, wherein the metallic rolling elements are disposed at a distance from each other.

4. A steering shaft according to claim 1, wherein the roller bearing has an outer rolling element disposed at each end and produced from plastic material.

5. The steering shaft according to claim 4, wherein the rolling elements produced from plastic material have a larger diameter than the metallic rolling elements disposed between the ends of the roller bearing.

6. The steering shaft according to claim 4, wherein a spacing between each rolling element produced from plastic and an adjacent rolling element is larger than a spacing between other rolling elements that are adjacent.

7. A steering shaft according to claim 1, wherein during a steering motion of a stopped motor vehicle, not only the rolling elements produced from plastic material, but also the metallic rolling elements disposed at the center in the axial direction rest against the hollow shaft.

8. A steering shaft according to claim 1, wherein the rolling elements are disposed in an axially displaceable cage.

9. A steering shaft according to claim 1, wherein the metallic rolling elements rest against the hollow shaft and the inner shaft during a failure of an electrical or hydraulic power assistance system.

10. A steering system for a motor vehicle comprising a steering shaft according to claim 1.

* * * * *